United States Patent
Zhou et al.

(10) Patent No.: US 10,122,166 B2
(45) Date of Patent: Nov. 6, 2018

(54) SYSTEM FOR INTEGRATED MULTI-ENERGY SCHEDULING CONTROL IN A MICRO-GRID

(71) Applicant: Accenture Global Services Limited, Dublin (IE)

(72) Inventors: Qin Zhou, Beijing (CN); Zhihui Yang, Beijing (CN); Zhejing Bao, Zhejiang (CN)

(73) Assignee: Accenture Global Services Limited, Dublin (IE)

( * ) Notice: Subject to any disclaimer, the term of this patent is extended or adjusted under 35 U.S.C. 154(b) by 295 days.

(21) Appl. No.: 15/042,032

(22) Filed: Feb. 11, 2016

(65) Prior Publication Data
US 2016/0172854 A1    Jun. 16, 2016

Related U.S. Application Data

(63) Continuation of application No. PCT/CN2013/081408, filed on Aug. 13, 2013.

(51) Int. Cl.
*G05B 13/02* (2006.01)
*H02J 3/00* (2006.01)
(Continued)

(52) U.S. Cl.
CPC ............ *H02J 3/00* (2013.01); *G05B 13/02* (2013.01); *G05B 13/048* (2013.01); *H02J 3/28* (2013.01);
(Continued)

(58) Field of Classification Search
CPC .............................. G05B 13/00; G05B 17/00
See application file for complete search history.

(56) References Cited

U.S. PATENT DOCUMENTS

| 8,396,572 B2 | 3/2013 | Torzhkov et al. |
| 2011/0066258 A1 | 3/2011 | Torzhkov et al. |

(Continued)

FOREIGN PATENT DOCUMENTS

| CN | 102545255 A | 7/2012 |
| CN | 102710013 A | 10/2012 |

(Continued)

OTHER PUBLICATIONS

Examination Report No. 3, dated Sep. 29, 2017, pp. 1-5, Australian Application No. 2013397866, Australian Patent Office, Phillip, Australia.

(Continued)

*Primary Examiner* — Cheung Lee
(74) *Attorney, Agent, or Firm* — Brinks Gilson & Lione

(57) ABSTRACT

A system provides integrated multi-energy scheduling control in a micro-grid. The micro-grid may comprise a combined cooling, heating and power CCHP unit and an ice-storage air conditioner. In embodiments, an integrated multi-energy scheduling control process for operation in the micro-grid is performed, based on the predicted electricity demand and cooling demand and the predicted renewable energy output, under process constraints to determine the amount of electricity exchanged between the micro-grid and a macro-grid, cooling power output and electricity output of the CCHP unit, and operation modes and cooling power output of the ice-storage air conditioner in time intervals in a scheduling period, wherein electricity supply/demand balance and cooling energy supply/demand balance are coupled. The system may achieve multi-energy supply/demand balance at a minimized operational cost, and may achieve a high energy efficiency of both the CCHP units and a high performance of the ice-storage air conditioner.

25 Claims, 7 Drawing Sheets

(51) Int. Cl.
  *H02J 3/28* (2006.01)
  *H02J 3/38* (2006.01)
  *G05B 13/04* (2006.01)

(52) U.S. Cl.
  CPC ......... *H02J 3/382* (2013.01); *H02J 2003/003* (2013.01); *Y02E 70/30* (2013.01)

(56) References Cited

U.S. PATENT DOCUMENTS

2013/0024014 A1* 1/2013 Sharma .................. G05B 17/02
                                              700/29
2013/0166043 A1   6/2013 Bozchalui et al.

FOREIGN PATENT DOCUMENTS

| CN | 102790391 A | 11/2012 |
| CN | 103034204 A | 4/2013 |
| CN | 203083197 U | 7/2013 |

OTHER PUBLICATIONS

Examination Report No. 1, dated Nov. 4, 2016, pp. 1-6, Australian Application No. 2013397866, Australian Patent Office, Phillip, Australia.
Examination Report No. 2, dated May 24, 2017, pp. 1-4, Australian Application No. 2013397866, Australian Patent Office, Phillip, Australia.
Written Opinion, dated May 30, 2014, pp. 1-4, PCT Application No. PCT/CN2013/081408, State Intellectual Property Office of the P.R. China (Isa/Cn), Beijing, China.
International Search Report, dated May 30, 2014, pp. 1-4, PCT Application No. PCT/CN2013/081408, State Intellectual Property Office of the P.R. China (ISA/CN), Beijing, China.
Lui Mengxuan, Research on Energy Management and Optimal Design of Microgrid Chinese Doctoral Dissertations (with English Abstract), Apr. 1, 2012, 123 pgs.
Hong, Bowen etc., Model and Method of Dynamic Multi-objective Optimal Dispatch for Microgrid Electric Power Automation Equipment (with English Abstract), Mar. 31, 2013, 9 pgs.

* cited by examiner

SYSTEM FOR INTEGRATED MULTI-ENERGY SCHEDULING CONTROL IN A MICRO-GRID

PRIORITY

This application is a continuation of PCT/CN2013/081408, filed Aug. 13, 2013, which is incorporated herein by reference.

TECHNICAL FIELD

Embodiments of the present disclosure relate to the field of power grid technology and more particularly to a system, method, and apparatus for energy scheduling control in a micro-grid.

BACKGROUND

Various industries have networks associated with them. One such industry is the utility industry that manages a power grid. The power grid may include one or all of the following: electricity generation, electric power transmission, and electricity distribution. Electricity may be generated using generating stations, such as a coal fire power plant, a nuclear power plant, etc. For efficiency purposes, the generated electrical power is stepped up to a very high voltage (such as, for example, 345K Volts) and transmitted over transmission lines. The transmission lines may transmit the power long distances, such as across state lines or across international boundaries, until it reaches its wholesale customer, which may be a company that owns the local distribution network. The transmission lines may terminate at a transmission substation, which may step down the very high voltage to an intermediate voltage (such as, for ex ample, 138K Volts). From a transmission substation, smaller transmission lines (such as, for example, sub-transmission lines) transmit the intermediate voltage to distribution substations. At the distribution substations, the intermediate voltage may be again stepped down to a "medium voltage" (such as, for example, from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as, for example, 120V). The consumer voltage may then be used by the consumers.

Nowadays, air pollution and fuel shortage are becoming top concerns of economy and society development. Thus a high efficient energy utilization is desirable to achieve energy saving and emission reduction and the energy scheduling is one of important ways to achieve the high efficient energy utilization.

SUMMARY OF THE DISCLOSURE

According to an aspect of the present disclosure, there is provided a system for integrated multi-energy scheduling control in a micro-grid. The micro-grid may comprise a combined cooling, heating and power CCHP unit and an ice-storage air conditioner. The system may comprise: at least one processor; and at least one memory storing computer executable instructions. The at least one memory and the computer executable instructions may be configured to, with the at least one processor, cause the system to: perform, based on predicted electricity demand and cooling demand and predicted renewable energy output, a multi-energy scheduling control process in the micro-grid under constraints of electricity supply/demand balance and cooling energy supply/demand balance, operation constraints for the CCHP unit and operation constraints for the ice-storage air conditioner, to determine the amount of electricity exchanged between the micro-grid and a macro-grid, cooling power output and electricity output of the CCHP unit, and operation modes and cooling power output of the ice-storage air conditioner in time intervals in a scheduling period, wherein the electricity supply/demand balance and the cooling energy supply/demand balance are coupled with each other.

According to another aspect of the present disclosure, there is provided a method for integrated multi-energy scheduling control in a micro-grid, wherein the micro-grid may comprise a combined cooling, heating and power CCHP unit and an ice-storage air conditioner. The method may comprise: performing, by using a processor, based on predicted electricity demand and cooling demand and predicted renewable energy output, a multi-energy scheduling control process in the micro-grid under constraints of electricity supply/demand balance and cooling energy supply/demand balance, operation constraints for the CCHP unit and operation constraints for the ice-storage air conditioner, to determine the amount of electricity exchanged between the micro-grid and a macro-grid, cooling power output and electricity output of the CCHP unit, and operation modes and cooling power output of the ice-storage air conditioner in time intervals in a scheduling period, wherein the electricity supply/demand balance and the cooling energy supply/demand balance are coupled with each other.

According to a further aspect of the present disclosure, there is provided an apparatus for integrated multi-energy scheduling control in a micro-grid. The micro-grid may comprise a combined cooling, heating and power CCHP unit and an ice-storage air conditioner. The apparatus may comprise: means for performing, based on predicted electricity demand and cooling demand and predicted renewable energy output, a multi-energy scheduling process for optimizing operation under constraints of electricity supply/demand balance and cooling energy supply/demand balance, operation constraints for the CCHP unit and operation constraints for the ice-storage air conditioner, to determine the amount of electricity exchanged between the micro-grid and a macro-grid, cooling power output and electricity output of the CCHP units, and operation modes and cooling power output of the ice-storage air conditioner in time intervals in a scheduling period, wherein the electricity supply/demand balance and the cooling energy supply/demand balance are coupled with each other.

According to a yet further aspect of the present disclosure, there is provided an apparatus for integrated multi-energy scheduling control in a micro-grid. The micro-grid may comprise a combined cooling, heating and power CCHP unit and an ice-storage air conditioner. The apparatus may comprise: process performing module configured to perform, based on predicted electricity demand and cooling demand and predicted renewable energy output, a multi-energy scheduling process for optimizing operation in the micro-grid under constraints of electricity supply/demand balance and cooling energy supply/demand balance, operation constraints for the CCHP unit and operation constraints for the ice-storage air conditioner, to determine the amount of electricity exchanged between the micro-grid and a macro-grid, cooling power output and electricity output of the CCHP unit, and operation modes and cooling power output of the ice-storage air conditioner in time intervals in a scheduling period, wherein the electricity supply/demand balance and the cooling energy supply/demand balance are coupled with each other.

According to a still yet further aspect of the present disclosure, there is provided a tangible non-transitory computer-readable medium having a plurality of instructions executable by a processor to schedule multi-energy in a micro-grid. The tangible computer-readable medium may comprise instructions configured to perform steps of the method according to the aspect of present disclosure.

Embodiments of the present disclosure provide an integrated multi-energy scheduling control solution in a micro-grid by controlling scheduling of the electricity energy and cooling energy in the micro-grid at the same time, which may achieve coupled multi-energy supply/demand balance at an optimized cost and at the same time, it may achieve a high energy efficiency of the CCHP units and a high performance of the ice-storage air conditioner. Moreover, it may also reduce the load difference between the peak load and the valley load of the micro-grid substantially as seen from the macro-grid.

Additionally, in some embodiments of the present disclosure, the operation constraints for the CCHP unit may be determined by taking the electricity output, ambient elevation and temperature as variables, and operation constraints for the ice-storage air conditioner may be obtained by considering four different operation modes and an operation model of ice-storage tank. In such a way, it could provide more accurate mathematic models, which are capable of reflecting actual operating conditions.

Besides, in some embodiments of the present disclosure, the integrated multi-energy scheduling control process may be performed by means of Particle Swarm Optimization (PSO) algorithm and thus it may provide global optimal solution. That is to say, the integrated multi-energy scheduling solution of the present disclosure could provide a more feasible schedule control solution for the multi-energy in the micro-grid.

BRIEF DESCRIPTION OF THE DRAWINGS

The above and other features of the present disclosure will become more apparent through detailed explanation on the embodiments as illustrated in the embodiments with reference to the accompanying drawings wherein like reference numbers represent same or similar components throughout the accompanying drawings of the present disclosure, wherein.

DETAILED DESCRIPTION OF EMBODIMENTS

Figure 1:
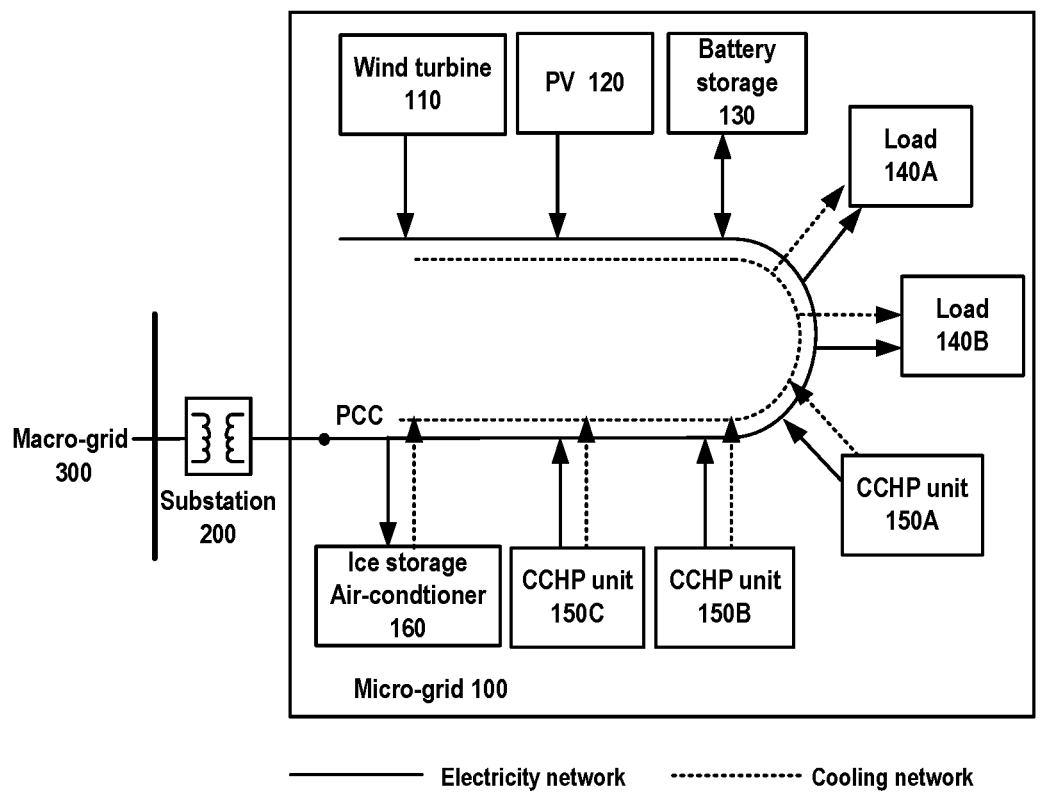
FIG. 1 schematically illustrates an exemplary architecture of a micro-grid in which embodiments of the present disclosure may be implemented.

Hereinafter, embodiments of the present disclosure will be described with reference to the accompanying drawings. In the following description, numerous specific details are set forth in order to provide a thorough understanding of the embodiments. However, it is apparent to the skilled in the art that implementation of the present disclosure may not have these details and the present disclosure is not limited to the particular embodiments as introduced herein. On the contrary, any arbitrary combination of the following features and elements may be considered to implement and practice the present disclosure, regardless of whether they involve different embodiments. Thus, the following aspects, features and embodiments are only for illustrative purposes, and should not be understood as elements or limitations of the appended claims, unless otherwise explicitly specified in the claims. Additionally, in some instances, well known methods and structures have not been described in detail so as not to unnecessarily obscure the embodiments of the present disclosure.

Currently, in some countries or areas, heat demand and cooling demand are provided by separated systems. For example, in many countries in China, the heat demand in winter is usually supplied by an existing central heating system, while the cooling demand in summer is met by air-conditioning systems. Moreover, in summer, the air conditioning systems usually accounts a great amount of loads (even more than 40% of the total power load in some cities), which causes a great growth of peak load and an increased pressure on power supply. Additionally, constantly growing cooling demand has induced a larger peak-valley load gap in power grid, even more than 30% sometimes, which is also a great waste of energy utilization.

Micro-grid is a supplemental solution to the existing bulk power grid to meet the energy demand and environment challenges. In view of this, an idea of the present disclosure is to perform integrated multi-energy scheduling control for the electricity and cold energy in a micro-grid, which uses Combined Cooling Heating and Power (CCHP) units and an ice-storage air-conditioner in micro-grid (MG) application to meet cooling demand.

The micro-grid was a concept proposed as a new-type network topology under a circumstance that great efforts have been made to develop renewable and clean distributed generators (DGs) in order to achieve energy saving and emission reduction. The micro-grid may be viewed as a cluster of renewable and clean DGs, such as photovoltaic (PV) panels, wind turbines (WTs) and Combined Cooling Heating and Power (CCHP) units, etc., to satisfy the customers' multi-type energy demands locally. Compared to a macro-grid, the micro-grid is a small scale energy supplying system that is autonomous and capable of being self-controlled, protected, and managed. In practice, the micro-grid could be either connected to the power grid or operated as a standalone power system to provide electric energy and/or heat or cooling energy to end customers within the micro-grid. Moreover, when the micro-grid is connected to a bulk power grid, it could provide the electricity back to the bulk power grid as well.

Hereinafter, reference will be first made to FIG. 1 to describe an exemplary architecture of a micro-grid in which embodiments of the present disclosure may be implemented. However, it should be appreciated, this architecture is illustrated only for a purpose of illustration, and the present disclosure may be also implemented in a different architecture.

As illustrated in FIG. 1, the micro-grid system 100 is connected with a macro-grid 300 (also referred to as a bulk power grid, a big power grid and so on) via a substation 200. In FIG. 1, the micro-grid system 100 integrates different types of renewable energy sources (such as wind power generator 110, a PV solar generator 120 etc.), CCHP units 150A-150C and an ice storage air-conditioner 160) together. The micro-grid system 100 may further include energy storage such as battery storage 130 and various loads such as load 140A and 140B. Each of load 140A and 140B may be an electricity load and/or a cold load. Within the micro-grid 100, the wind turbine 110 and the PV solar generator 120 will provide electricity energy; the CCHP units 150A and 150B uses fuel gas (such as natural gas) as primary energy to provide electricity, and, at the same time, its generated heat energy during the electricity generating process could be collected and utilized to provide cooling energy or heat energy, which depends on operation mode of the CCHP units; the ice-storage air-conditioners 160 could behave either as an electricity load or as both electricity load and a cooling energy generator at the same time. Thus, for the micro-grid, its electricity supply/demand balance and the cooling energy supply/demand balance are coupled with each other due to the working mode variations of CCHP units and the ice-storage air conditioner. Also, the electricity and cooling demand could be provided by either directly from electricity supply sources, or from both electricity supply sources and cooling supply sources.

Actually, the micro-grid may be taken as a supplemental solution to the existing bulk power grid (i.e., the macro-grid) to meet the energy demand and environment challenges. By means of such a micro-grid, it may achieve multiple advantages over the traditional bulk power grid, such as high energy efficiency, meeting customers' multi-energy demands at low cost, improved reliability, minimized impact of renewable energy output variation. In view of this, a new integrated optimization scheduling control method is proposed herein to deal with the cooling demand balance in the micro-grid, which is to optimally control multi-energy supply simultaneously such that high energy efficiency could be achieved while the total cost of meeting multi-energy demand of the micro-grid could be minimized.

Next, the method for multi-energy scheduling control in a micro-grid will be described in detail with reference to FIG. 2.

Figure 2:
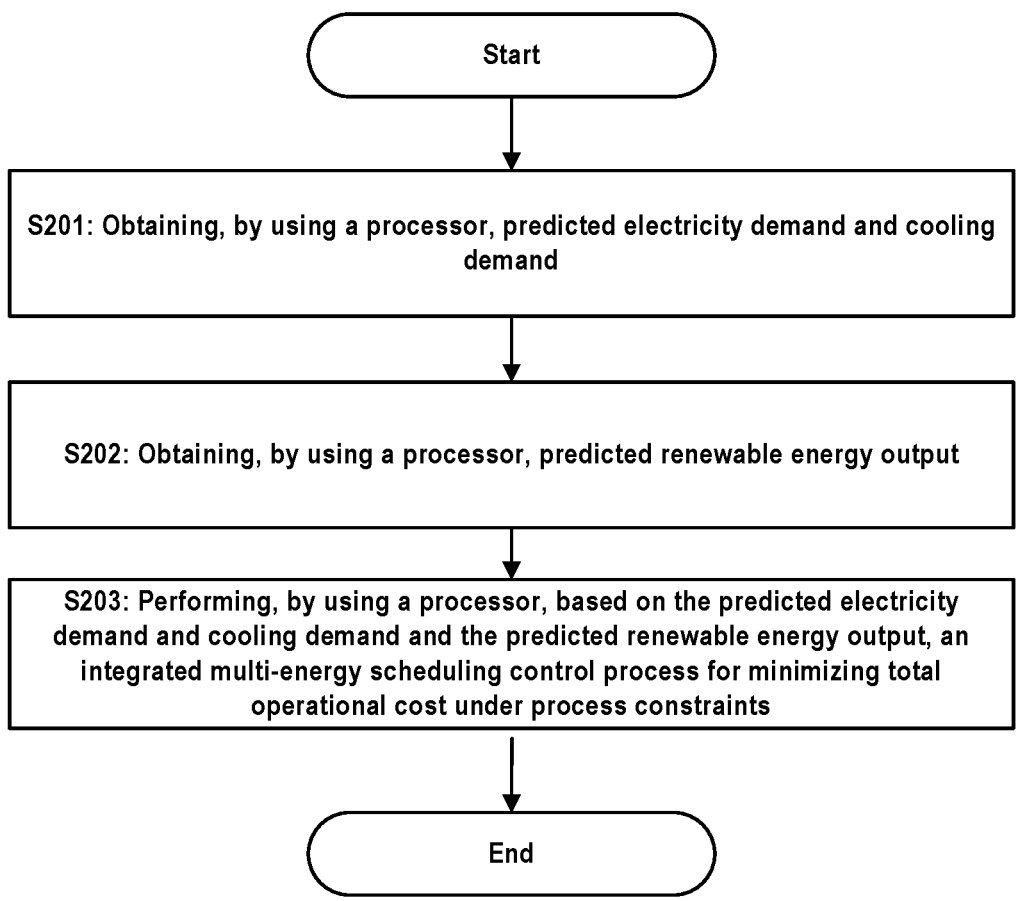
FIG. 2 schematically illustrates a flow chart of a method for integrated multi-energy scheduling control in a micro-grid according to an example embodiment of the present disclosure.

As illustrated in FIG. 2, predicted electricity and cooling demands are first may be obtained at step S201.

In example embodiments of the present disclosure, the optimal scheduling control may be performed one day ahead, for example at 23:00 in a day or any other applicable time, which is related to the time when the valley time begins. Thus, different energy demands in the micro-grid may be predicted based on historical electricity and cooling demands, for example, hourly electricity and cooling demands 24 hours ahead. However, it should be appreciated that the historical electricity and cooling demands are not limited to those 24 hours ahead and it may be electricity and cooling demands less or more hours head. Besides, generally, energy demands might be different between workdays and weekend, therefore, it may be also feasible to determine the multi-energy demands based on energy demands in each day one week ago. Additionally, the electricity and cooling demands may be predicted or estimated further based on predicted weather conditions. Actually, in the prior art, there are a lot of demand prediction approach which may be used in the present disclosure, and thus detailed description of the demand prediction will be omitted for a purpose of not obscuring the present disclosure.

Then, at step S202, predicted renewable energy output may be obtained. As mentioned hereinabove, in the micro-grid, there are renewable energy sources such as such as wind power generators 110 and PV solar generators 120. These renewable energy sources will provide electricity to customers and thus it may predict electricity output of renewable energy sources before energy scheduling.

In the art, that was proposed many approaches for predicting electricity output of renewable energy sources and thus detailed description of the energy output prediction will be omitted for a purpose of not obscuring the present disclosure. Besides, in scenario illustrated in FIG. 1, the renewable energy output is a sum of electricity output of the wind power generators 110 and the PV solar generators 120. However, it should be noted that the micro-grid may comprise any other energy source and it is not limited to wind power generators and PV solar generators.

Then, at step S203, a multi-energy scheduling control process may be performed with an objective of minimization of total operational cost in the micro-grid under process constraints, so as to determine the amount of electricity exchanged between the micro-grid and the macro-grid and cooling output and electricity output of the CCHP unit and operation modes and cooling output of the ice-storage air conditioner in time intervals of a scheduling period In embodiments of the present disclosure, the process constraints may include, for example, constraints of electricity supply/demand balance and cooling energy supply/demand balance, operation constraints for the CCHP unit and operation constraints for the ice-storage air conditioner. Especially, the electricity supply/demand balance and the cooling energy supply/demand balance are coupled with each other due to CCHP units and the ice-storage air conditioner.

In embodiments of the present disclosure, the integrated multi-energy scheduling is performed by an optimization process, so as to handle the micro-grid supply scheduling when multiple forms of energy demands exist, multiple types of supply sources are available and the supply/demand balances for the multiple forms of energy are coupled with each other. To optimally schedule the multi-energy in the micro-grid, the first thing is to build an optimization model; however, before this, several components in the micro-grid should be modeled.

For example, for the CCHP unit, manufactures usually provide only the unit's performance when the CCHP unit is operated at its full load/output and under a standard operation condition (so-called ISO condition, i.e., at fixed temperature, altitude, and pressure values). Nominal power output and exhaust characteristics (such as exhaust temperature and exhaust flow velocity versus ambient temperature) for the CCHP unit are also given. Moreover, the relationships between the cooling power output and the exhaust characteristics are also presented in the document of absorption refrigerator which is used for the waste heat driven cooling in the CCHP unit As a matter of fact, when the CCHP unit is in operation, its operating conditions usually vary due to its location, altitudes, temperature of the working hour, day and season, especially electricity and cooling demands that it is supplying. Thus, its electricity and cooling output will vary greatly. Hence, it requires a model which is adapted to practical application conditions instead of ideal conditions. Additionally, to optimally schedule the electricity and cooling supply simultaneously, it is further required to learn an accurate model of ice-storage air-conditions. Therefore, hereinafter, models for the CCHP unit and models for the ice-storage air-conditions as proposed in the present disclosure will be described at length.

Herein, two new analytic models for the CCHP units have been built through considering electricity output, the temperature, the altitude, inlet pressure loss and back pressure of the CCHP unit as variables and new models for the ice-storage air conditioner are proposed by taking its different operation modes and characteristic of an ice-storage tank (which is an important component of the ice-storage air conditioner) into account. Thus, these models are accurate, compressive mathematic formulas capable of representing actual operation conditions, which will be described next.

Micro-Grid Components Modeling

I. CCHP Unit Modeling

Hereinafter, for a purpose of illustration, micro-turbine Capstone C200, which has been wildly used in the art, will be taken as an example CCHP unit contained in the micro-grid, to explain embodiments of the present disclosure.

I-1. Electricity Output Efficiency Modeling

Generally, the electricity out efficiency of a CCHP unit is function of the electricity output of the CCHP unit, and thus the electricity output efficiency of the CCHP unit may be simply expressed as follows:

$$E_{CHP}(t) = f(P_{CHP}(t)) \quad (1)$$

wherein, $E_{CHP}(t)$ denotes the CCHP unit's electricity output efficiency at given time t; and $P_{CHP}(t)$ is CCHP unit's electricity output at given time t.

Additionally, in the manufacturer's documents, there is usually given the nominal output power $P_{ISO-max}$ under a standard working condition (named ISO condition) and full-load state. However, the CCHP output will vary as the ambient elevation H and temperature T change, which means its performance under non-ISO conditions and partial-load state should be taken into account as well if it is desired to determine the electricity output efficiency more accurately.

In C200 documents, there are provided many parameters or measurements which may be used for the electricity output modeling. Based on these parameters or measurements, the following models may be established one by one:

Influence of the ambient elevation H and temperature T on the maximum output power $P_{A-max}$. In the C200 documents, there are provided a plurality of measurements at different ambient elevation H and different temperature T, based on these measurements, it may determine a specific relationship between the maximum output power and the ambient elevation H and temperature T by, for example, piecewise linear fitting, the relationship may be represented as below:

$$P_{A-max} = f_1(H, T); \quad (2)$$

Function between the full-load efficiency $E_{A-max}$ and temperature T. Similarly, based on those measurements at different temperatures, the following function may be obtained by, for example, a cubic polynomial fitting:

$$E_{A-max} = f_2(T); \quad (3)$$

Power correction factors and efficiency correction factors for full-load state under ISO condition. Power output and efficiency are usually affected by inlet pressure loss I_p_loss and back pressure B_p of the CCHP unit. Based on measurements on power output and efficiency at different inlet pressure loss and back pressure as provided in C200 documents, it may determine the power correction factors and efficiency correction factors for inlet pressure loss I_p_loss and back pressure B_p respectively, which may be denoted by $P\_CF_{I\_P}$, $E\_CF_{I\_P}$, $P\_CF_{B\_P}$, $E\_CF_{B\_P}$ respectively. The power correction factors and efficiency correction factors are all in a linearity relationship with inlet pressure loss I_p_loss and back pressure B_p of the CCHP unit. Additionally, these two parameters inlet pressure loss I_p_loss and back pressure B_p may be determined once the CCHP unit is installed;

Additionally, based on the measurements on power output and efficiency in full-load condition given in those documents, partial-load performance model under ISO condition may be obtained by means of curve fitting as follows:

$$E_{ISO} = f_{ISO}\left(\frac{P_{ISO\_part}}{P_{ISO\_max}}\right). \quad (4)$$

wherein the functions $f_1$, $f_2$, $f_{ISO}$, $f$ are all nonlinear function.

Finally, based on the above equations (2) to (4) and these power and efficiency correction factors $P\_CF_{I\_P}$, $E\_CF_{I\_P}$, $P\_CF_{B\_P}$, $E\_CF_{B\_P}$, it may derive the CCHP partial-load performance under a given operation condition as follows:

$$E_{CHP}(t) = f(P_{CHP}(t)) = f_{ISO}\left(\frac{P_{CHP}(t)}{P_{ISO-max}}\right) \times \frac{E_{max}}{f_{ISO}\left(\frac{P_{max}}{P_{ISO-max}}\right)}, \quad (5)$$

where $P_{max}$ and $E_{max}$ are the maximum efficiency and the maximum output power under a given working condition respectively. The $P_{max}$ and $E_{max}$ may be obtained through correcting, by means of the above-mentioned power and efficiency correction factors, $P_{A-max}$ and $E_{A-max}$, which respectively denote the maximum efficiency and output power under the given working condition without considering effects induced by inlet pressure loss I_p_loss and back pressure B.

That is to say, the maximum efficiency and output power under the given working condition may be corrected by those correction factors so as to consider effects induced by inlet pressure loss I_p_loss and back pressure B. For example, $P_{max}$ and $E_{max}$ may be expressed as:

$$P_{max}=P_{A\text{-}max}*P\_CF_{I\_P}*P\_CF_{B\_P}, E_{max}=E_{A\text{-}max}*P\_CF_{I\_P}*P\_CF_{B\_P}. \quad (6)$$

However, it can be appreciated that the present disclosure is not limited to the embodiment in which the parameters $P_{max}$ and $E_{max}$ are corrected by these correction factors for the inlet pressure loss and back pressure of the CCHP unit and it is also possible if the $P_{max}$ and $E_{max}$ are not corrected.

Besides, the model may further include relationship between the consumed gas volume, the electricity output and electricity output efficiency. If the lower heating value of natural gas, denoted by $\eta_{CHP}$, is known, gas volume F(t) consumed by a CCHP unit may be determined as $$F(t)=P_{CHP}(t)/E_{CHP}(t)/\eta_{CHP}. \quad (7)$$

Generally, the electricity output $P_{CHP}(t)$ has an upper bound, i.e. the maximum electricity. In addition, to avoid lower efficiency, the CCHP unit's electricity output $P_{CHP}(t)$ may preferably have a lower bound constraint. Thus, by combing with the lower and upper bound constrains, it may obtain $$I_{CHP}(t)P_{min} \leq P_{CHP}(t) \leq P_{max}I_{CHP}(t). \quad (8)$$

wherein $I_{CHP}(t)$ is 0-1 variable denoting whether the CCHP unit operates or not. The $P_{min}$ may be, for example, $0.2*P_{max}$.

It is also noted that in some countries or areas, it will be more cost efficient to buy electricity from the macro-grid then running CCHP units with natural gas in some time intervals. For example, in China, for most of the commercial and industrial customer, the electricity price in valley period is about 0.3 RMB/kwh and the natural gas price is always 2 RMB/m3. The natural gas price with the same economic cost as buying electricity from macro-grid is about 1.90 RMB/m3 ($\eta_{CHP}$=10 kWh/m3), which means that, during valley period, it is much cheaper to buy the electricity from macro-grid than running CCHP units. Thus, it will be preferable if the operation of the CCHP units may be restrained to only the off-valley time, i.e., it may have the following constraint $$I_{CHP}(t)=0, t \in T_{valley} \quad (9)$$

However, it should be noted, for other areas and counties which employ different pricing policy, the constraint as defined in equation (9) may be modified accordingly or even be omitted.

I-2. Modeling of Electricity Output Vs Cooling Output

Generally, cooling output $Q_{CHP}(t)$ of the CCHP is closely related to exhaust characteristics, such as the exhaust temperature E_T(t) and exhaust flow velocity E_V(t). Based on the measurements on power output at different exhaust temperature and exhaust flow velocity, which may respectively represent by the functions by means of quadratic polynomial fitting and piecewise linear fitting respectively:

$$E\_T(t)=g_1(T,P_{CHP}(t)) \text{ and } E\_V(t)=g_2(T,P_{CHP}(t)) \quad (10)$$

Thus, it may obtain the following relationship between the cooling output $Q_{CHP}(t)$ and electricity power $P_{CHP}(t)$ under a given working condition:

$$Q_{CHP}(t)=g(P_{CHP}(t)) \quad (11)$$

wherein $Q_{CHP}(t)$ is cooling output of the CCHP unit at given time t; and $P_{CHP}(t)$ is electricity output of the CCHP unit at given time t.

When the CCHP unit works at the mode wherein the cooling energy output is determined based on the $P_{CHP}(t)$, the corresponding $Q_{CHP}$(t) can be derived by Eq. (10). On the contrary, when the CCHP unit works at the mode wherein the power generation is determined based on the cooling demand, the corresponding output power $P_{CHP}(t)$ may be given by $$P_{CHP}(t)=g^{-1}(Q_{CHP}(t)). \quad (12)$$

Furthermore, the following constraints might be placed on the cooling output $Q_{CHP}(t)$ so as to avoid a low efficiency:

$$I_{CHP}(t)Q_{min} \leq Q_{CHP}(t) \leq I_{CHP}(t)Q_{max} \quad (13)$$

wherein $Q_{min}=g(P_{min})$ and $Q_{max}=g(P_{max})$.

Beside, it may be appreciated that during start/stop operation, the above-relationships may be different to those operation states. For Capstone C200, relevant tests show that the CCHP unit possesses rapid dynamic responses in start, stop and output adjustment. For example, during the start operation, the cost time is about 120 s from initiation to full-load state; the whole stop process consumes less than 200 s; and the output adjustment following load change can finish approximately in 80 s. In view of this, it seems that constraints on start/stop operation and ramping up/down may be ignored in the day-ahead scheduling.

Although in the above description, the constraints on start/stop operation and ramping up/down are suggested to be ignored, it should be appreciated that, if desired, the constraints on start/stop operation and ramping up/down may also be considered.

II. Ice-storage Air-conditioner Modeling

An ice storage air-conditioner usually contains an ice chiller, a cooling tower, an ice-storage tank, pump and other auxiliary equipments, and the ice-storage air-conditioners may work in different operation modes. For example, when consuming electricity to provide the cooling energy to the customer or when converting the electricity energy into the cooling energy stored in the form of ice, it could work as an electricity load, while it may work as a cooling energy generator to release the energy stored in the ice back to the air so as to provide the cooling energy to the customers.

In view of this, herein, it will establish mathematic models for the following four operation modes, 1) Air-conditioning mode, in which only an ice chiller works to satisfy the cooling demand;
2) Ice-making mode, in which the ice chiller stores cooling capacity by making ice, preferably during off-peak period;
3) Ice melting mode, in which the ice-storage tank performs ice melting to meet cooling demand; and
4) Ice melting & air-conditioning mode, in which ice melting by ice-storage tank and air-conditioning by the ice chiller are combined together.

That is to say, the models for the four operation modes will define the cooling output as a function of its inputs (namely, the electricity energy, or cooling energy stored in form of ice) of ice-storage air-conditioner under 4 operation modes.

In addition, the ice-storage tank is an important device in the ice-storage air conditioner and it may be required to be modeled to establish an accurate model.

Hereinafter, the air-conditioning mode may be denoted by $I_a(t) \in (0,1)$; the ice-making mode may be denoted by $I_c(t) \in (0,1)$; the ice melting mode may be denoted by $I_d(t) \in (0,1)$;

and the ice melting & air-conditioning mode is regarded as a combination of the ice melting mode and the air-conditioning modem, wherein, if the ice-storage air conditioner operates in a operation mode, the value of the corresponding variable $I_a(t)$, $I_c(t)$ and $I_d(t)$ will be 1, otherwise, the value will be 0; and if both values of $I_a(t)$ and $I_d(t)$ are 1, it denotes the ice-storage air conditioner operates in the ice melting & air-conditioning mode. Next, detailed description will be made to the models for the ice storage air-conditioner in the four operation modes.

II-1. Air-conditioning Mode:

In the air-conditioning mode, the ice chiller will run within its rated capacity to provide cooling energy as much as possible. On the other hand, for higher efficiency, the ice chiller may avoid running at lower load ratios, which means it may impose a constraint as follows:

$$I_a(t)Q_{a\text{-}min} \leq Q_a(t) \leq I_a(t)Q_{a\text{-}max}, \tag{14}$$

where $Q_a(t)$ $Q_{a\text{-}min}$ and $Q_{a\text{-}max}$ denote the output cooling power at the time t, and the minimal and maximum cooling power of ice chiller in air-conditioning mode, respectively. $Q_{a\text{-}min}$ is defined as for example 20% of $Q_{a\text{-}max}$.

When $Q_a(t)$ falls within the constraints as given (14), the COP (coefficient of performance) varies linearly with $Q_a(t)$. Therefore, partial load model of the ice chiller may be derived by curve fitting method and represented for example as follows:

$$P_a(t) = \frac{Q_a(t)}{a_1 * Q_a(t) + a_2}, \tag{15}$$

wherein $P_a(t)$ is consumed electricity power and $a_i$ (i=1,2) represent coefficients of linear fitting to data provided by the manufacturer of the ice-storage air conditioner.

In addition, a normal air-conditioner with a smaller capacity is usually equipped to meet the cooling demand in valley periods because the ice chiller often runs in ice-making mode during valley periods, and the ice-making and ice-conditioning mode is not recommended to occur simultaneously for a purpose of economic operation. Therefore, it may further obtain the following constraints.

$$I_a(t)=0, \ t \epsilon T_{valley}. \tag{16}$$

II-2. Ice-Making Mode:

In the ice-making mode, the ice chiller usually operates at its maximum cooling $Q_{a\text{-}max}$ to pursue a larger COP, i.e. the cooling energy as made may be expressed as:

$$Q_c(t)=I_c(t)Q_{a\text{-}max} \tag{17}$$

In such a case, the operation of ice-making mode can also be described as $$P_c(t) = \frac{Q_c(t)}{a_3 * Q_c(t) + a_4}, \tag{18}$$

wherein $P_c(t)$ is the electricity consumption and $a_i$ (i=3,4) represent coefficients of linear fitting to data provided by the manufacturer of the ice-storage air conditioner.

In addition, for a purpose of economic operation, the ice-making mode should continuously run in valley period. Therefore, it may further have the following constraints:

$$\begin{cases} \sum_{t=1}^{T} |I_c(t+1) - I_c(t)| = 2 \\ I_c(t) = 0, \ \notin T_{valley} \end{cases} \tag{19}$$

II-3. Ice-melting Mode:

Generally, for the ice-melting mode, it may limit its operation only in off-valley periods for the economic operation. That is to say, the following constraint may be obtained.

$$I_d(t)=0, \ t \epsilon T_{valley} \tag{20}$$

On the other hand, when the ice-storage tank implements ice melting to provide the cooling energy $Q_d(t)$, the power consumption $P_d(t)$ is a very small constant while the cooling energy $Q_d(t)$ should satisfy constraints for its bound.

$$0 \leq Q_d(t) \leq I_d(t)*Q_{d\text{-}max} \tag{21}$$

wherein $Q_{d\text{-}max}$ is defined as for example 20% of $IS_{max}$ and $IS_{max}$ is the maximum capacity of the ice-storage tank.

II-4. Combined Ice-melting & Air-conditioning Mode

As mentioned hereinbefore, the ice melting & air-conditioning mode may be regarded as a combination of the ice melting mode and the air-conditioning mode and thus its model is the combination thereof, i.e., equations (14) to (16) and equations (20) to (21). Thus, detailed description about the model under the ice melting & air-conditioning mode will be omitted for a purpose of simplicity.

II-5. Model for the Ice-storage Tank

In addition, the ice-storage tank is may be modeled by considering the dissipation coefficient, the refrigeration efficiency and the maximum storage capacity $IS_{max}$. The cooling energy $IS(T)$ stored in the ice-storage tank at time T may be written as follows:

$$IS(T)=(1-\eta_1)IS(T-1)+\eta_2 Q_c(T)-Q_d(T), \tag{22}$$

where $\eta_1$ is the dissipation coefficient of stored cooling energy, which is chosen to be 0.2; and $\eta_2$ is refrigeration coefficient, which may equal to be 0.67.

Additionally, at each off-valley time T, to meet the total gap between the cooling demand and the maximum available cooling supply that may be provided by the CCHP units and air-conditioning mode for the following off-valley times after T, the minimal required cooling energy storage $IS_{min}(T)$ in the tank may be defined as $$IS_{min}(T) = \sum_{\substack{tt \notin T_{valley} \\ tt >= T}} Q_{Gap}(tt), \ T \notin T_{valley}, \tag{23}$$

where $Q_{Gap}(tt)$ denotes the gap between the cooling demand and the maximum available cooling supply provided by the CCHP units and air-conditioning mode and it may be expressed by:

$$Q_{Gap}(tt) = \begin{cases} Q_{load}(tt) - Q_{max} - Q_{a\text{-}max}, & \text{if } Q_{load}(tt) - Q_{max} - Q_{a\text{-}max} > 0 \\ 0 & \text{other} \end{cases}$$

Then, it may obtain the following constraints $$IS(T) \geq IS_{min}(T), \ T \notin T_{valley} \tag{24}$$

Considering that, during the valley periods, the ambient temperature is lower and ice-making continuously run, dissipation of ice-storage tank can be omitted. Thus, at the end of valley time $T_{end\_valley}$, the stored cooling capacity $IS(T_{end\_valley})$ is $$IS(T_{end\_valley})T_c\eta_2 Q_{a-max}, \quad (25)$$

where $T_c$ is the duration of continuous ice-making mode in hour. According to Eq. (18), it holds $$T_c \geq IS_{min}(T_{end\_valley})/(\eta_2 Q_{a-max}). \quad (26)$$

In addition, there may also exists the upper bound constraint for $T_c$, i.e.

$$T_c \leq \min(IS_{max}/(\eta_2 Q_{a-max}), L_{valley}) \quad (27)$$

where $L_{valley}$ is the duration of valley periods in hour. Also, $IS(T)$ ($T \notin T_{valley}$) may have an upper bound constraint as below:

$$IS(T) \leq (1-\eta_1)IS(T-1), T \notin T_{valley} \quad (28)$$

Hereinbefore, the models for the CCHP unit and the ice-storage air conditioner have been described and next, and, based on the above mentioned mathematic models for the CCHP units and the models for ice-storage air-conditioner, it is possible to perform the integrated optimal energy scheduling control. Hereinafter, the integrated optimal scheduling control will be detailed.

Integrated Optimal Scheduling Model

A main object of embodiments of the present disclosure is to develop an integrated micro-grid scheduling model, where the micro-grid contains CCHP units, ice-storage air conditioners, and other power supply source such as wind power generators, and PV solar generators.

In the micro-grid as proposed in the present disclosure, both the wind power generators and the PV solar generators will provide electricity energy; the CCHP units could provide electricity and, at the same time, provide the cooling energy by utilizing its generated heat energy during the electricity generating process; and the ice-storage air-conditioners could behave either as an electricity load, or as both an electricity load and a cooling energy generator at the same time. Thus, in the micro-grid, the electricity supply/demand balance and the cooling energy supply/demand balance are coupled with each other, which means its electricity and cooling demands could be provided by either directly from electricity supply sources or from both electricity and cooling supply sources. Thus, in embodiments of the present disclosure, there is proposed an integrated optimal energy scheduling model.

By learning historical electricity and cooling demand such as the hourly electricity and cooling demand, for example, 24~48 hours ahead, it may estimate the hourly electricity and cooling demand. In this way, this micro-grid operation model may optimally schedule the electricity and cooling supply simultaneously such that the total cost of meeting the electricity and cooling demand of the micro-grid could be minimized and the high energy efficiency of CCHP units and the high performance of ice-storage air conditioners could be achieved as well. In such a sense, this optimization model is critical for the micro-grid supply scheduling control when multiple kinds of energy demands exist, multiple types of supply sources are available and supply/demand balances for multiple kinds of energy are coupled with each other.

In embodiments of the present disclosure, the micro-grid energy scheduling control may have an objective of minimizing the expected total cost, which may be expressed as follows:

$$\min F_{obj} = \sum_{t=1}^{24} c_{Grid}(t) P_{Grid}(t) + \sum_{t=1}^{24} c_{Gas}(t) F(t) \quad (29)$$

wherein $P_{Grid}(t)$ is the exchanged power between micro-grid and the macro-grid; $c_{Grid}(t)$ is the price of exchanged electricity; $c_{Gas}(t)$ is the natural gas price; $F(t)$ is CCHP consumed gas volume. Thus, it is clear that the first item at the right side of equation (22) denotes the cost of electricity exchanged between the micro-grid and the macro-grid and the second item denotes the cost of purchasing the gas for the CCHP units.

In the above optimization scheduling problem, the scheduling period may be, for example, one day, i.e., 24 hours, and the scheduling period may be divided into 24 time intervals. However, the skilled in the art should appreciate that the present disclosure is not limited thereto, it may use any shorter or longer suitable schedule period and the time intervals may have a different time length such as half hour, 2 hours, and etc.

The constraints for the scheduling control process comprise at least electricity supply/demand balance, cooling energy supply/demand balance and physical and operational constraints of CCHP units and ice-storage air-conditioners. For a purpose of illustrations, these constraints are listed as follows:

1) Electricity supply/demand balance:

$$P_{Grid}(t)+P_{CHP}(t)+P_{PV}(t)+P_{wind}(t)=P_{load}(t)+I_a(t)P_a(t)+I_c(t)P_c(t)+I_d(t)P_d(t) \quad (30)$$

wherein $P_{Grid}(t)$ denotes the exchanged power between micro-grid and the macro-grid; $P_{CHP}(t)$ denotes the output electricity by CCHP units; $P_{wind}(t)$ denotes the output electricity from wind power generators; $P_{PV}(t)$ denotes the output electricity from solar power generators; $P_{load}(t)$ is the electric load or the determined electricity demand; $I_a(t)$, $I_c(t)$, $I_d(t)$ denote different operation modes of the ice-storage air conditioner; and $P_a(t)$, $P_c(t)$, $P_d(t)$ denote consumed power in different operation modes.

2) Cooling energy supply/demand balance:

$$Q_{CHP}(t)+Q_a(t)+Q_d(t)=Q_{load}(t), \quad (31)$$

wherein $Q_{CHP}(t)$ is the output cooling power by CCHP units; $Q_a(t)$ denotes the output cooling power by the ice-storage air conditioner in air-conditioning mode; $Q_d(t)$ denotes the output cooling power by the ice-storage air conditioner in ice-melting mode; and $Q_{load}(t)$ is the cooling load, or the determined cooling demand.

3) micro-grid components operational constraints:
The operating constraints of CCHP units are shown in equations. (5)-(13).
The operating constraints of ice-storage air-conditioner are shown in equations. (14)-(28).
The exchanged power between the macro-grid and the micro-grid $P_{Grid}(t)$ should satisfy $$0 \leq P_{Grid}(t) \leq P_{Grid-max} \text{ or } -P_{Grid-max} \leq P_{Grid}(t) \leq P_{Grid-max} \text{ or } P_{Grid}(t)=0 \quad (32)$$

The three constraints given in equation (32) may be selected based on requirements in real application. Particularly, the given three constraints respectively correspond to cases in which it is forbidden to provide the electricity back to the macro-grid; it is allowed to exchange power between the macro-grid and the micro-grid in both directions; it is forbidden to exchange the power between the macro-grid and the micro-grid.

Although the specific constraints have been described, the present disclosure is not limited thereto. Actually, from teaching provided therein, the skilled in the art may conceive many alternative constrains, for example through modifying some of the constraints, omitting some of the constraints and adding some new constraints without depart of the spirit of the present disclosure.

Optimal Scheduling Solution

It may be seen that, the above-mentioned micro-grid scheduling process is a mix-integer nonlinear optimization problem, with the objective in equations (29) and constraints in Equations. (5)-(13), (14)-(28). The variables to be solved include 0-1 variables $I_a(t)$, $I_c(t)$, $I_d(t)$, and $I_{CHP}(t)$, and continuous variables $Q_a(t)$, $Q_c(t)$, $Q_d(t)$ $Q_{CHP}(t)$, $P_{CHP}(t)$, and $P_{Grid}(t)$ wherein t=1 to 24.

To efficiently solve the optimal micro-gird scheduling problem, it may consider employing Particle Swarm Optimization (PSO) algorithm. It is know that the PSO algorithm, which was first proposed by Kennedy and Eberhart in 1995, is a stochastic, population-based algorithm modeled on swarm intelligence and generally, it consists of a population (or swarm) of particles, each of which represents a potential solution. Particles are assigned with random initial positions and fly through problem space with velocities to reach the global optimal solution. The fly velocity is influenced by both particle's own experience and the knowledge acquired by the particle from the swarm. With the PSO algorithm, it is capable of solving complex non-linear optimization problem with a high probability of finding the global optimal solution. Additionally, it is easily implemented with high computation efficiency and can provide robust computation performance. Thus, the PSO algorithm might be a suitable algorithm to solve the micro-grid scheduling problem in the present disclosure, which is a typical complex mix integer nonlinear programming problem.

In using the PSO algorithm in the optimal scheduling solving, it is important to select variables or parameters as particles and appropriate selection of particles may facilitate the solving greatly. In embodiments of the present disclosure, the parameters $Q_{CHP}(T)$ (or $P_{CHP}(T)$), and IS(T) may be chosen as particles although it is also possible to select other parameters as particles. Besides respective constraints of the parameters selected as particles, there also exist complex coupled constraints among these particles. Consequently, the correction may be carried out to assure these coupled constraints to be satisfied after the particles are updated in their respective searching space. This means that the basic PSO can not be applied to the present disclosure directed, or in other word, the PSO algorithm applied herein is different from the basic one.

Figure 3:
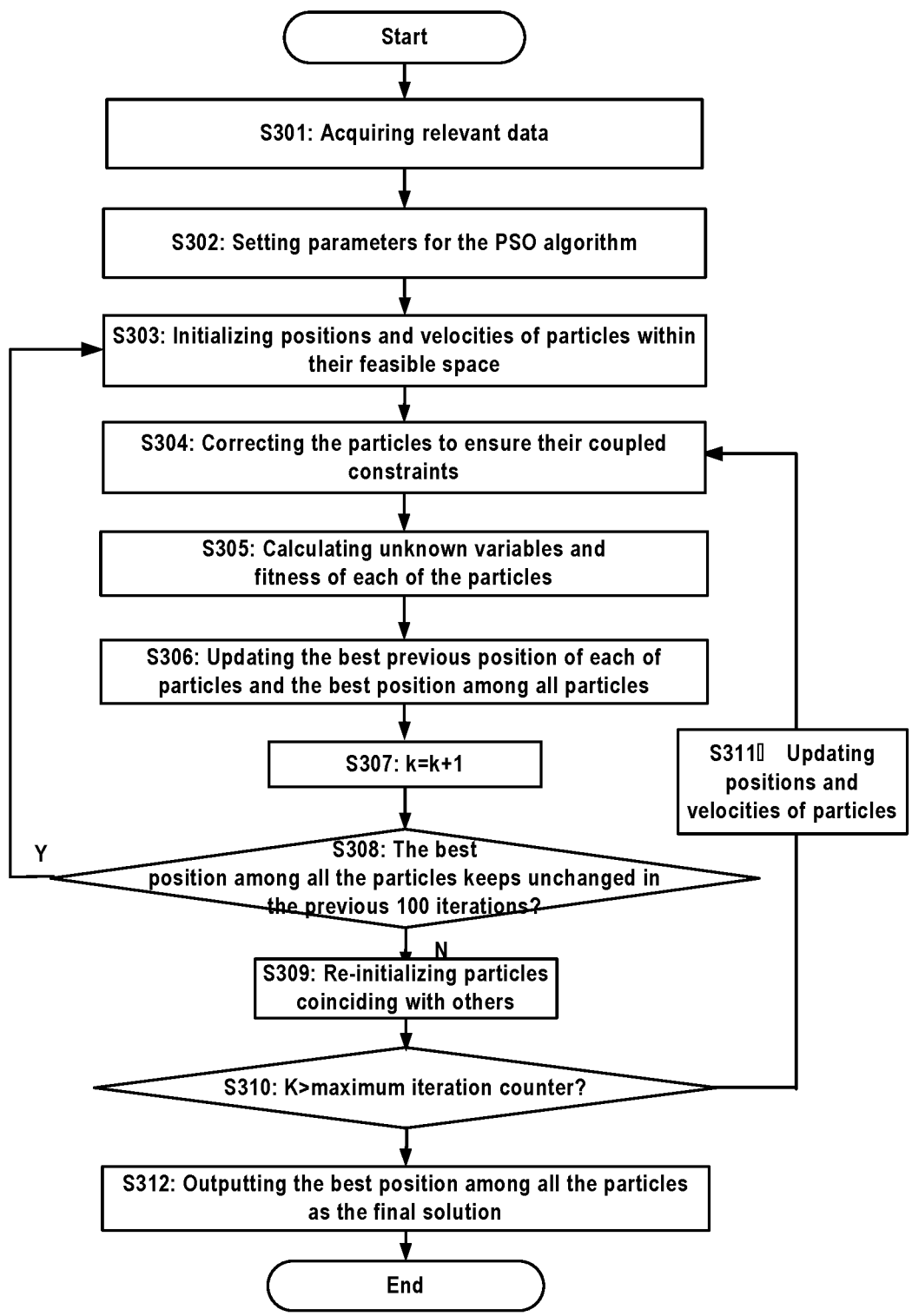
FIG. 3 schematically illustrates a flow chart of an approach for performing the integrated multi-energy scheduling control according to an example embodiment of the present disclosure.

Hereinafter, reference will be made to FIG. 3 to describe the modified PSO algorithm at length wherein the micro-grid is operated in grid-connected mode as an example.

First, as shown in step S301, relevant data required for solving the optimization problem are acquired, which includes, for example, predicted electricity and cooling demands and predicted renewable energy output. Additionally, the environmental parameters, micro-source parameters, electricity price and gas price may also be contained.

Then, at step S302, parameters for the PSO algorithm are set. Particularly, it may set, for example, the number of particles, the maximum iteration counter, the initial radius of particles, the upper and lower bound limit of searching space of each particle, and set the initial value of the iteration counter, for example, as zero, i.e., k=0.

Next, positions of the particles and their respective velocities are initialized within their feasible space at step S303. Specifically, positions of particles $Q_{CHP}(T)$ are initialized so that the $Q_{CHP}(T)$ satisfies operations constraints of the CCHP units, for example, those given in equations (5) to (13); the ice-making periods in valley time are randomly chosen while following the operations constraints of the ice-storage air conditioner; and then the ice-storage level $IS(T_{end\_valley})$ at the end of valley periods is calculated; and finally velocities of all particles $Q_{CHP}(T)$ and IS(T) are initialized.

In addition, at step S304, the particles may further be corrected to guarantee their coupled constraints to be satisfied. It should be noted that the operation at step S304 are not required to do in the first iteration, which means it may be performed after the particles are updated in their respective searching space. Particularly, for $Q_{CHP}(T)$ it may have the corrected constraints $Q_{CHP}(T) \leq Q_{load}(T)$, while for each $IS(T_{end\_valley})$ it may randomly generate particles IS(T) $IS(T)(T=T_{end\_valley}+1, \ldots, 24)$ in turn under the constraints given as follows:

$IS(T) \geq IS_{min}(T)$;

$IS(T) \leq (1-\eta_1)IS(T-1)$; and $(1-\eta_1)IS(T-1) - IS(T) \leq \min(Q_{d\text{-}max}(T), Q_{load}(T) - Q_{CCHP}(T))$.

At step S305, the unknown variables are calculated based on the particles $Q_{CHP}(T)$ and IS(T), the electricity supply/demand balance constraint, the cooling energy supply/demand balance constraints, and the components performance. Further, the fitness values of the particles are calculated, which may be composed by for example the operational cost C plus penalty on the violated components constraints.

Then, the best previous position of each of the particles and the best position among all the particles are updated at step S306. However, for the first iteration, the required operation is to record the best previous position of each of particles and the best position among them. Afterwards, the process enters step S307 wherein the iteration counter is updated i.e. k=k+1 and the process proceeds into step S308.

At step S308, it may determine whether the best position among all the particles keeps substantially unchanged in the previous 100 iterations or not. If the best position does not keep unchanged, the process returns to step S303; on the other hand, if the best position does keep unchanged, then it may re-initialize particles which collides with other particles at step S309 and then the process continues step S310.

At step S310, it determines whether one of the stopping criteria is reached, for example, whether the iteration counter is greater than the predetermined maximum iteration counter; if so, the process proceeds into step S312 wherein values of variables according to the particle with the minimum fitness value in the last generation are outputted as the final solution; otherwise, the particles velocities and positions are updated at step S311 and the process proceeds into step S304 to repeat the above mentioned operations.

In such a way, it may solve the integrated optimal scheduling problem and obtain the amount of electricity exchanged between the micro-grid and the macro-grid, cooling output and electricity output of the CCHP unit, and operation modes and cooling output of the ice-storage air conditioner in time intervals in a scheduling period.

However, it should be noted that although the PSO algorithm has been described as an approach to solve the optimal scheduling problem, the present disclosure is not only limited thereto and it is also feasible to use any suitable manner to solve the problem.

With embodiments of the present disclosure, there is proposed an integrated multi-energy scheduling control solution in micro-grid by controlling scheduling of the electricity and cooling energy at the same time, which may achieve multi-energy supply/demand balance at optimized cost and achieve a high energy efficiency of the CCHP units and a high performance of the ice-storage air conditioner. Moreover, it may also substantially reduce the load difference between peak load and valley load of the micro-grid as seen from the macro-grid.

Additionally, in some embodiments of the present disclosure, the operation constraints for the CCHP unit may be determined by taking the electricity output, ambient elevation and temperature as variables, and operation constraints for the ice-storage air conditioner may be obtained by considering four different operation modes and an operation model of ice-storage tank. In such a way, it could provide more accurate mathematic models, which are capable of reflecting actual operating conditions.

Besides, in some embodiments of the present disclosure, the integrated multi-energy scheduling control process may be performed by means of Particle Swarm Optimization (PSO) algorithm and thus it may provide global optimal solution. That is to say, the integrated multi-energy scheduling solution of the present disclosure could provide a more feasible schedule solution for the multi-energy in the micro-grid.

It should be noted that, although the present disclosure has been described with reference to steps S201 and S202 in which the predicted demands and predicted renewable energy are obtained by predicting them respectively, the present disclosure is not limited thereto and the predicted electricity and cooling demands and the predicted renewable energy output may also parameter values received from one or more other systems responsible for predicting these parameter values. Furthermore, it should be noted that operations at step S304 may be also placed behind step S311 instead of inserting between steps S303 and S305.

Hereinabove, the modeling of the CCHP unit and the ice-storage air conditioner has been described with reference to specific mathematic model, but it should be noted that the present disclosure is not only limited to these specific mathematic model. By contrast, it may make various modification to these specific mathematic model, for example adding more constraints, omitting some of constraints, etc., without departing the spirit of the present disclosure.

Figure 4A:
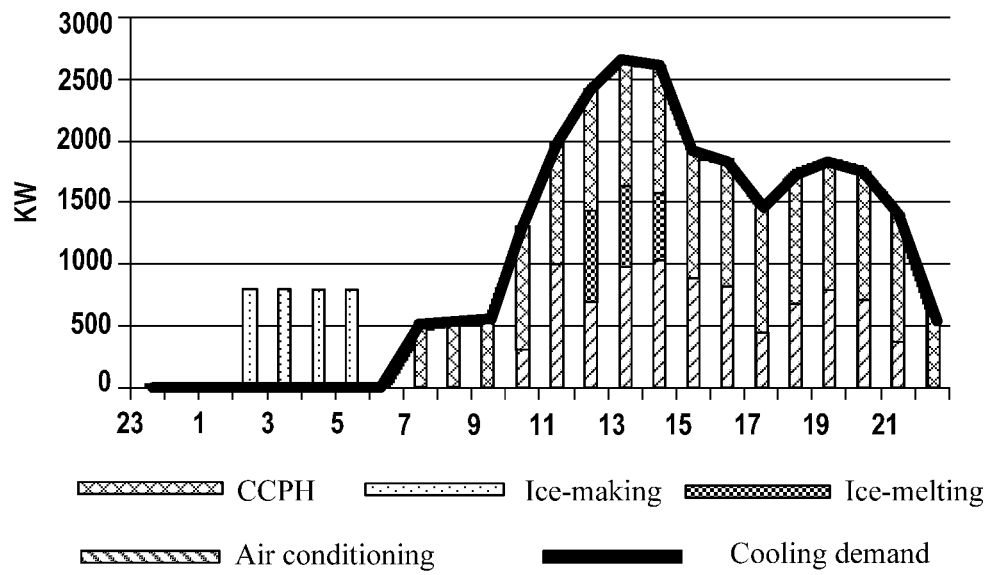
FIG. 4A schematically illustrates a diagram of cooling demand and cooling supply in a micro-grid determined in a simulation based on an integrated multi-energy scheduling control system according an example embodiment of the present disclosure.
Figure 4B:
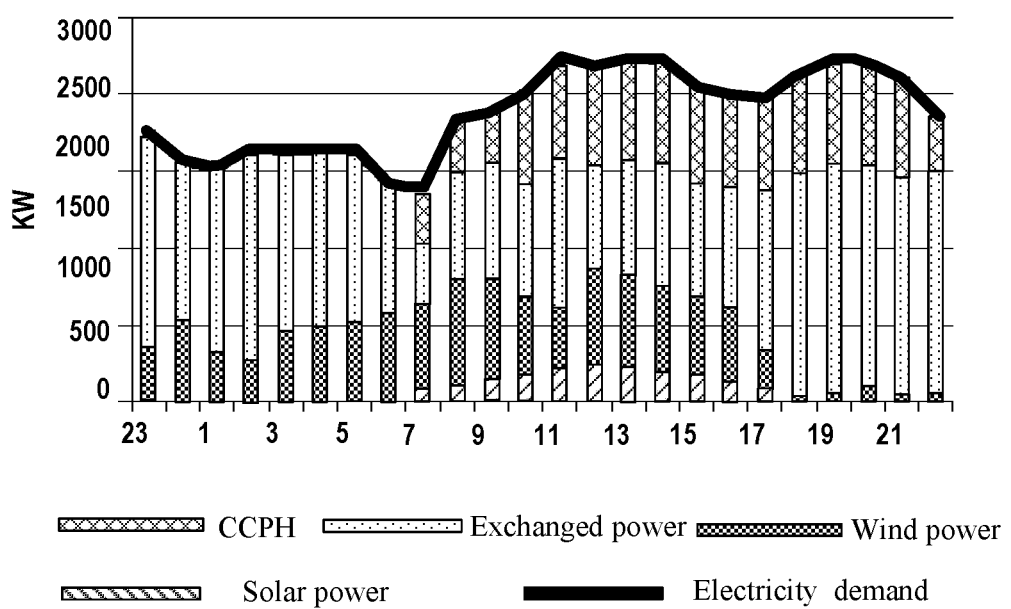
FIG. 4B schematically illustrates a diagram of and power supply in the micro-grid determined in a simulation based on an integrated multi-energy scheduling control system according an example embodiment of the present disclosure.
Figure 4C:
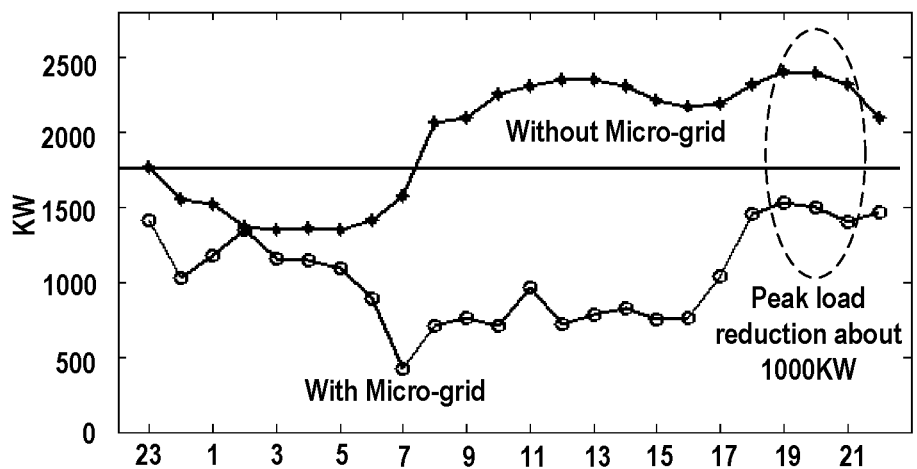
FIG. 4C schematically illustrates a curve for the electricity exchanged between the micro-grid and the macro-grid according to an example embodiment of the present disclosure and a curve for the electricity that would consumed without the micro-grid.

FIGS. 4A to 4C illustrate diagrams showing scheduled results for the electricity and the cooling energy and comparison between the electricity exchanged between the micro-grid and the macro-grid and the electricity that would consumed without the micro-grid. Parameters used in the simulations are listed as below for a purpose of illustration:

TABLE 1

Simulation parameters

| Component Name | Parameters and values | Note |
|---|---|---|
| CCHP | 4* C200 units; Altitude: 1500 feet; Temperature: 35□ ; and Air pressure: standard atmospheric pressure. | |
| Ice-storage air conditioner | The maximum cooling power: Pmax = 1000 KW; Capacity of the ice-storage tank: 3500 KWH; Ice-storagy Efficiency: 0.67. | |
| Electricity price: | Valley hours price: 0.308 yuan/kWh; Peak hours price: 0.928 yuan/kWh. | |
| Gas price: | 2 yuan/m³ | |

In FIG. 4A and FIG. 4B, there are illustrated the cooling demand and cooling supply of the micro-grid and electricity supply of the micro-grid, which are results or solution as determined by means of the PSO algorithm based on the optimal multi-energy scheduling control process according to an embodiment of the present disclosure. It is clear that it may well achieve supply/demand balance for both cooling energy and electricity.

FIG. 4C illustrates a curve for the electricity exchanged between the micro-grid and the macro-grid and a curve for the electricity that would consumed without the micro-grid. From FIG. 4C, it may be seen that in from the point of view of the macro-grid, the peak load of the micro-grid has been reduced to about 1500 KW, and the valley load is reduced to about 600 KW, which means the load difference of peak load and valley load has been greatly reduced compared to the solution without micro-grid as seen from the macro-grid. At the same time, due to the reduction of power supplied by the macro-grid, the purchase cost from the macro-grid has reduced greatly as seen from the macro-grid, thus, the customer's operation costs can be minimized substantially and the supply pressure on the macro-grid may be reduced substantially.

Figure 5:
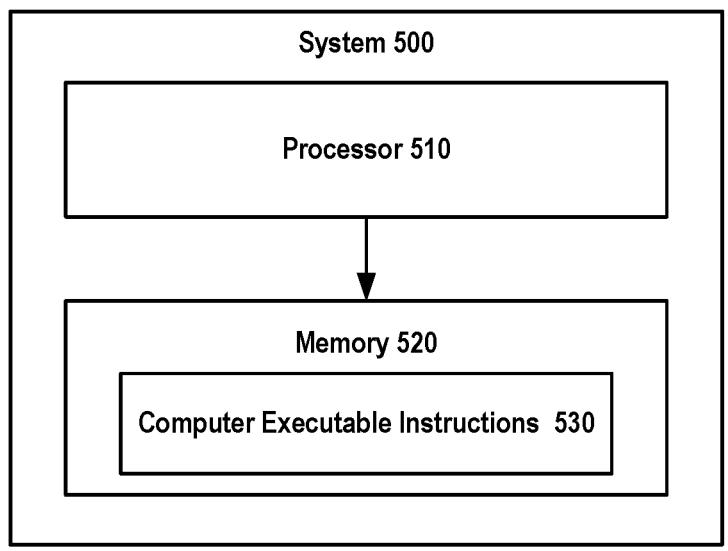
FIG. 5 schematically illustrates a block diagram of a system for multi-energy scheduling control in a micro-grid according to an example embodiment of the present disclosure.

Additionally, in embodiments of the present disclosure, there is also provided a system which will be described with reference to FIG. 5. As illustrated in FIG. 5, the system 500 for integrated multi-energy scheduling control in a micro-grid may comprise at least one processor 510; and at least one memory 520 storing computer executable instructions 530. The at least one memory 520 and computer executable instructions 530 configured to, with the at least one processor 510, cause the system to: obtain predicted electricity demand and cooling demand; obtain predicted renewable electricity output and perform, based on the predicted electricity demand and cooling demand and the predicted renewable energy output, a multi-energy scheduling control process for minimizing a total operational cost in the micro-grid under constraints of electricity supply/demand balance and cooling energy supply/demand balance, operation constraints for the CCHP unit and operation constraints for the ice-storage air conditioner, to determine the amount of electricity exchanged between the micro-grid and the macro-grid, cooling output and electricity output of the CCHP unit, and operation modes and cooling output of the ice-storage air conditioner in time intervals in a scheduling period. Especially, the electricity supply/demand balance and the cooling energy supply/demand balance are coupled with each other.

In an embodiment of the present disclosure, the operation constraints for the CCHP unit may an electricity output efficiency model and an electricity output and cooling output relationship model.

In another embodiment of the present disclosure, the electricity output efficiency model and the electricity output and cooling output relationship model may be determined by taking the electricity output, ambient elevation and temperature as variables.

In a further embodiment of the present disclosure, the electricity output efficiency model may comprise a relationship between electricity output efficiency and electricity output of the CCHP unit and the relationship may be expressed as $$E_{CHP}(t) = f(P_{CHP}(t)) = f_{ISO}\left(\frac{P_{CHP}(t)}{P_{ISO-max}}\right) \times \frac{E_{max}}{f_{ISO}\left(\frac{P_{max}}{P_{ISO-max}}\right)},$$

wherein $E_{CHP}(t)$ denotes the electricity output efficiency of the CCHP unit at a given time t;

$P_{CHP}(t)$ denotes the electricity output of the CCHP unit at a given time t; $P_{ISO-max}$ denotes a nominal output power of the CCHP unit under a standard working condition; $E_{max}$ denotes the maximum efficiency of the CCHP unit under the given working condition;

$P_{max}$ denotes the maximum output power of the CCHP unit under a given working condition; and $f_{ISO}$ denotes a partial-load performance function under the standard work condition.

In a still further embodiment of the present disclosure, the maximum efficiency of the CCHP unit under the given working condition and the maximum output power of the CCHP unit under the given working condition may be corrected by power correction factors and efficiency correction factors for inlet pressure loss and back pressure of the CCHP unit.

In a yet further embodiment of the present disclosure, the electricity output and cooling output relationship mode may comprise relationship between cooling output and electricity output and the relationship may be expressed as $$Q_{CHP}(t) = g(P_{CHP}(t)),$$

wherein $Q_{CHP}(t)$ denotes the cooling output of the CCHP unit at a given time t; $P_{CHP}(t)$ denotes the electricity output of the CCHP unit at a given time t; and g( ) denotes a function between the cooling output and the electricity output of the CCHP unit.

In a still yet further embodiment of the present disclosure, the electricity output efficiency model further comprises one or more of: relationship between consumed gas volume and the electricity output and the electricity output efficiency; a lower bound constraint on the electricity output of the CCHP unit; an upper bound constraint on the electricity output of the CCHP unit; and operation time limitations for the CCHP unit.

In another further embodiment of the present disclosure, the electricity and cooling output model may further comprise one or more of: a lower bound constraint on the cooling output of the CCHP unit; and an upper bound constraint on the cooling output of the CCHP unit.

In a further embodiment of the present disclosure, the operation constraints for the ice-storage air conditioner may comprise: an operation model in air-conditioning mode, an operation model in ice-making mode, an operation model in ice-melting mode, an operation model in ice-melting & air-conditioning mode, and an operation model of ice-storage tank.

In a still further embodiment of the present disclosure, each of the operation model in air-conditioning mode, the operation model in ice-making mode, the operation model in ice-melting mode, the operation model in ice-melting & air-conditioning mode may comprise a cooling output constraint.

In a yet further embodiment of the present disclosure, each of the operation model in air-conditioning mode, the operation model in ice-making mode, the operation model in ice-melting mode, and the operation model in ice-melting & air-conditioning mode may comprise an operation time limitation.

In a still yet further embodiment of the present disclosure, wherein the operation model in air-conditioning mode may be determined by a curve fitting method and it may be represented by:

$$P_a(t) = \frac{Q_a(t)}{a_1 * Q_a(t) + a_2}$$

wherein $P_a(t)$ denotes consumed electric power at a given time t; $Q_a(t)$ denotes output cooling power at the given time t; and $a_1$ and $a_2$ denote coefficients used in linear fitting.

In a still yet further embodiment of the present disclosure, the operation model in ice-making mode is determined by a curve fitting method and it is represented by:

$$P_c(t) = \frac{Q_c(t)}{a_3 * Q_c(t) + a_4}$$

wherein $P_c(t)$ denotes consumed electric power at a given time t; $Q_c(t)$ denotes output cooling power at a given time t; and $a_3$ and $a_4$ denote coefficients used in linear fitting.

In another embodiment of the present disclosure, the operation model in ice-melting & air-conditioning mode may be a combination of the operation model in air-conditioning mode and the operation model in ice-melting mode.

In still another embodiment of the present disclosure, the operation model of ice-storage tank may comprise: a relationship between cooling energy stored in ice-storage tank and dissipation coefficient, refrigeration efficiency and the maximum storage capacity of the ice-storage tank.

In yet another embodiment of the present disclosure, the operation model of ice-storage tank may comprise a relationship that is expressed by $$IS(T) = (1-\eta_1)IS(T-1) + \eta_2 Q_c(T) - Q_d(T)$$

where IS(T) denotes the cooling energy stored in the ice-storage tank at a given time T;

$\eta_1$ is a dissipation coefficient of stored cooling energy;

$\eta_2$ is a refrigeration coefficient;

$Q_c(T)$ denotes output cooling power in the ice-making mode at a given time T; and $Q_d(T)$ denotes output cooling power in the ice-melting mode at a given time T.

In still yet another embodiment of the present disclosure, the operation model of ice-storage tank further comprises one or more of: a lower bound constraint on the cooling energy stored in the ice-storage tank in off-valley time; an upper bound constraint on the cooling energy stored in the ice-storage tank in off-valley time; a constrain on the cooling energy stored in the ice-storage tank at end of valley time; a lower bound constraint on a continuous duration of ice-make mode; and an upper bound constraint on a continuous duration of ice-make mode.

In a further embodiment of the present disclosure, the multi-energy scheduling control process may be performed further under constraints for electricity exchanging between the micro-grid and the macro-grid.

In a still further embodiment of the present disclosure, the multi-energy scheduling control process may be performed by means of a particle swarm optimization algorithm, and the cooling output or the electricity output of the CCHP unit and cooling energy stored in ice-storage tank of the ice-storage air conditioner are selected as particles for the particle swarm optimization algorithm.

In a yet further embodiment of the present disclosure, in each of iterations of the particle swarm optimization algorithm, particles are corrected, after being updated in their respective searching spaces, so that coupled constraints among the particles can be guaranteed.

In another embodiment of the present disclosure, the multi-energy scheduling control process may have an objective function that is expressed by $$\min F_{obj} = \sum_{t=1}^{24} c_{Grid}(t)P_{Grid}(t) + \sum_{t=1}^{24} c_{Gas}(t)F(t)$$

wherein t denotes an index of time intervals in the scheduling period;
$P_{Grid}(t)$ is the amount of electricity exchanged between the micro-grid and the macro-grid at time interval t;
$c_{Grid}(t)$ is exchanged electricity price at time interval t;
$c_{Gas}(t)$ is natural gas price at time interval t; and
F(t) is gas volume consumed by the CCHP unit at time interval t.

In still another embodiment of the present disclosure, the micro-grid further may comprise a wind power generator and a solar power generator, and the constraint for the electricity supply/demand balance may be expressed by $$P_{Grid}(t)+P_{CHP}(t)+P_{PV}(t)+P_{wind}(t)=P_{load}(t)+I_a(t)P_a(t)+I_c(t)P_c(t)+I_d(t)P_d(t)$$

wherein $P_{Grid}(t)$ denotes the amount of electricity exchanged between the micro-grid and the macro-grid;
$P_{CHP}(t)$ denotes the electricity output by CCHP unit;
$P_{wind}(t)$ denotes the electricity power from the wind power generator;
$P_{PV}(t)$ denotes the electricity power from the solar power generator;
$P_{load}(t)$ is the electric load or the predicted electricity demand;
$I_a(t), I_c(t), I_d(t)$ denote air-conditioning mode, ice-making mode and ice-melting mode of the ice-storage air conditioner respectively; and
$P_a(t), P_c(t), P_d(t)$ denote consumed power in air-conditioning mode, ice-making mode and ice-melting mode of the ice-storage air conditioner respectively.

In still another embodiment of the present disclosure, the constraint for the cooling energy supply/demand balance may be expressed by $$Q_{CHP}(t)+Q_a(t)+Q_d(t)=Q_{load}(t),$$

wherein $Q_{CHP}(t)$ is the cooling output of the CCHP units;
$Q_a(t)$ denotes the cooling output of the ice-storage air conditioner in air-conditioning mode;
$Q_d(t)$ denotes the cooling output of the ice-storage air conditioner in ice-melting mode; and
$Q_{load}(t)$ is cooling load, or the predicted cooling demand.

In a still yet further embodiment of the present disclosure, the scheduling period may have a time length of 24 hours and the time interval may have a time length of 1 hour.

In a still yet further embodiment of the present disclosure, the historical electricity demand and cooling demand may comprise hourly electricity demand and hourly cooling demand in a previous day.

Figure 6:
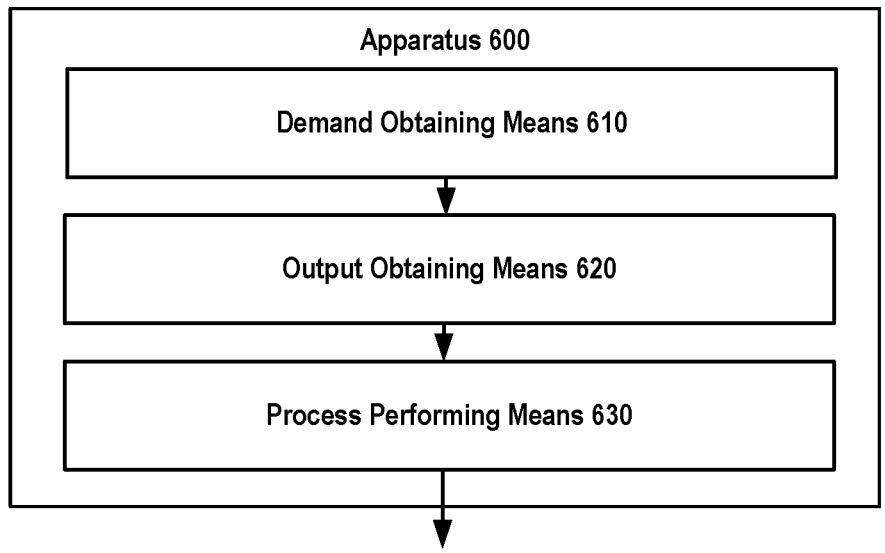
FIG. 6 schematically illustrates a block diagram of an apparatus for integrated multi-energy scheduling control in a micro-grid according to an example embodiment of the present disclosure.

Besides, there is also provided an apparatus for multi-energy scheduling control in micro-grid. As illustrated in FIG. 6, apparatus 600 may comprise means 610 for obtaining, predicted electricity demand and cooling demand; means 620 for obtained predicted renewable energy output and means 630 for performing, based on the predicted electricity demand and cooling demand and predicted renewable energy output, a multi-energy scheduling control process for minimizing a total operational cost in the micro-grid under constraints of electricity supply/demand balance and cooling energy supply/demand balance, operation constraints for the CCHP unit and operation constraints for the ice-storage air conditioner, to determine the amount of electricity exchanged between the micro-grid and a macro-grid, cooling output and electricity output of the CCHP unit, and operation modes and cooling output of the ice-storage air conditioner in time intervals in a scheduling period. Especially, the electricity supply/demand balance and the cooling energy supply/demand balance are coupled with each other.

Figure 7:
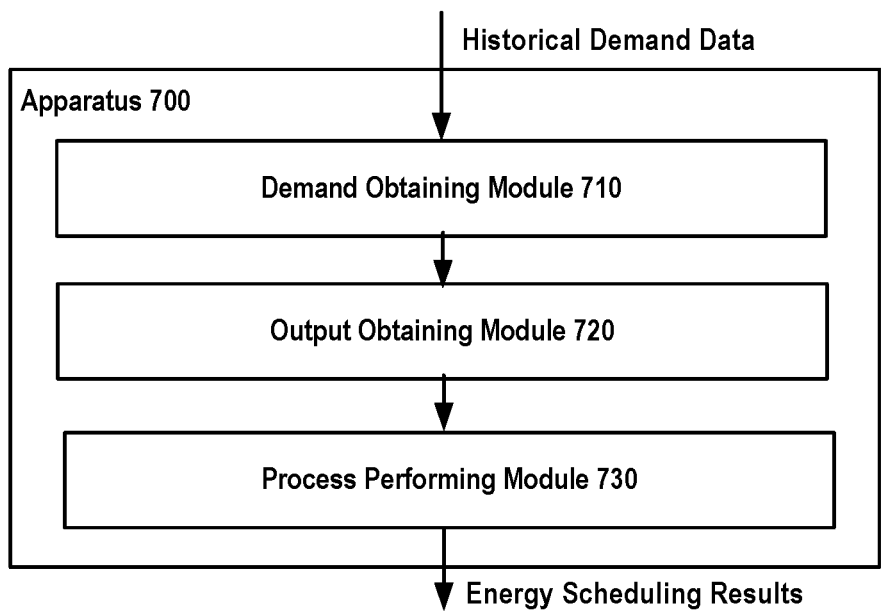
FIG. 7 schematically illustrates a block diagram of an apparatus for integrated multi-energy scheduling control in a micro-grid according to another example embodiment of the present disclosure.

Besides, there is provided another apparatus for multi-energy scheduling in a micro-grid. FIG. 7 schematically illustrates a block diagram of apparatus for integrated multi-energy scheduling in a micro-grid according to an example embodiment of the present disclosure. As illustrated in FIG. 7, apparatus 700 may comprise demand obtaining module 710, output obtaining module 720 and process performing module 730. The demand obtaining module 710 may be configured to obtain predicted electricity demand and cooling demand. The output obtaining module 720 may be configured to obtain predicted renewable energy output. The process performing module 730 may be configured to perform, based on the predicted electricity demand and cooling demand and predicted renewable energy output a multi-energy scheduling process for minimizing a total operational cost in the micro-grid under constraints of electricity supply/demand balance and cooling energy supply/demand balance, operation constraints for the CCHP unit and operation constraints for the ice-storage air conditioner, to determine the amount of electricity exchanged between the micro-grid and a macro-grid, cooling output and electricity output of the CCHP unit, and operation modes and cooling output of the ice-storage air conditioner in time intervals in a scheduling period. Especially, the electricity supply/demand balance and the cooling energy supply/demand balance are coupled with each other.

Furthermore, there is provided a tangible computer-readable medium having a plurality of instructions executable by a processor to manage loads of a power grid, the tangible computer-readable medium comprises instructions configured to perform steps of the method according to any embodiments of method of the present disclosure.

It should be noted that operations of respective models or means as comprised in the system 500, apparatus 600, apparatus 700 substantially correspond to respective method steps as previously described. Therefore, for detailed operations of respective models or means in the system 500, apparatus 600 and apparatus 700, please refer to the previous descriptions of the methods of the present disclosure with reference to FIGS. 1 to 4D.

Figure 8:
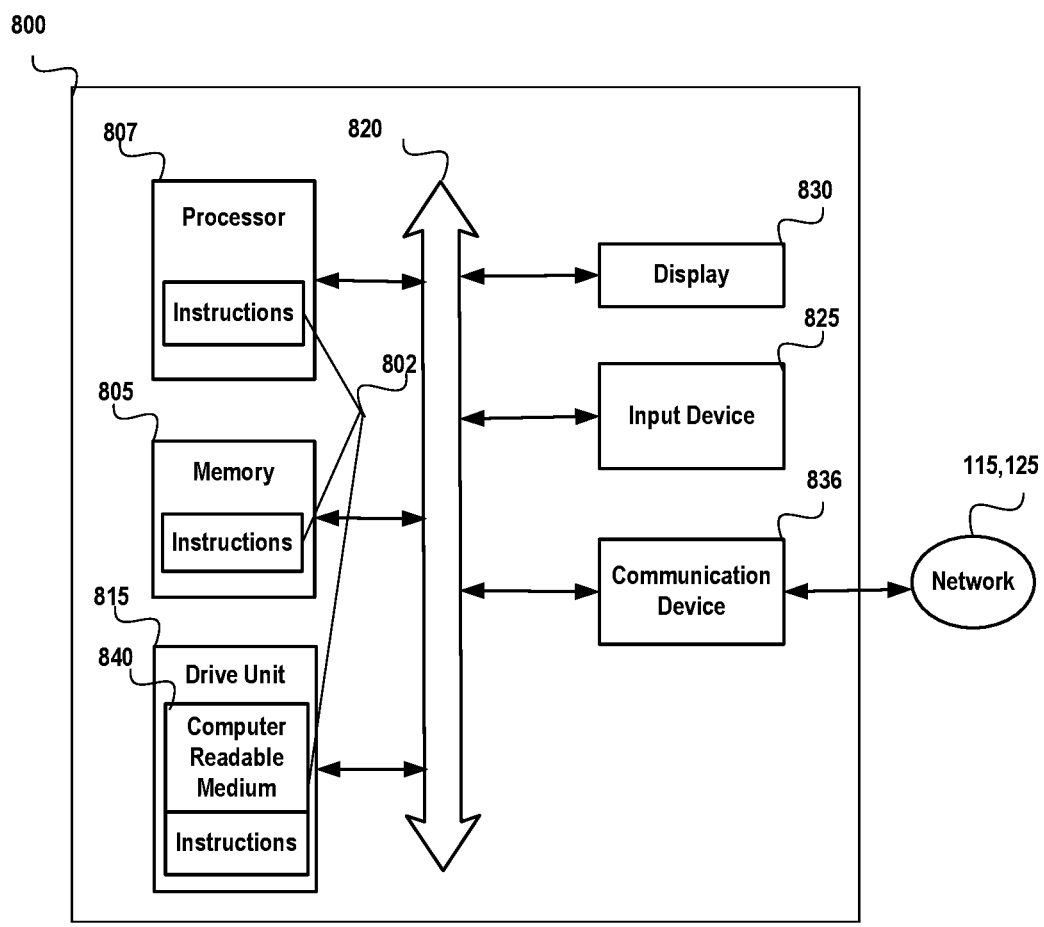
FIG. 8 schematically illustrates a computer system, programmable to be a specific computer system, which may represent any of the computing devices referenced herein.

FIG. 8 is a general computer system 800, which may represent any of the computing devices referenced herein. For instance, the general computer system 800 may represent—in part or in its entirety—the control center, the head end, the integrated network operations and management system (NOMS), the fault, performance, and configuration management (FPCM) module, or any other computing devices referenced herein such as the end devices, the meters, the telemetry interface units (TIUs), the collectors, and/or any networked components such as routers, switches or servers as discussed herein. The computer system 800 may include an ordered listing of a set of instructions 802 that may be executed to cause the computer system 800 to perform any one or more of the methods or computer-based functions disclosed herein. The computer system 800 may operate as a stand-alone device or may be connected, e.g., using the network 115, 125, to other computer systems or peripheral devices.

In a networked deployment, the computer system 800 may operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile computing device capable of executing a set of instructions 802 that specify actions to be taken by that machine, including and not limited to, accessing the network 115, 125 through any form of browser. Further, each of the systems described may include any collection of sub-systems that individually or jointly execute a set, or multiple sets, of instructions to perform one or more computer functions.

The computer system 800 may include a processor 807, such as a central processing unit (CPU) and/or a graphics processing unit (GPU). The processor 807 may include one or more general processors, digital signal processors, application specific integrated circuits, field programmable gate arrays, digital circuits, optical circuits, analog circuits, combinations thereof, or other now known or later-developed devices for analyzing and processing data. The processor 807 may implement the set of instructions 802 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility with computer processing or networked communication.

The computer system 800 may include a memory 805 on a bus 820 for communicating information. Code operable to cause the computer system to perform any of the acts or operations described herein may be stored in the memory 805. The memory 805 may be a tangible non-transitory computer readable medium or non-transitory memory, such as a random-access memory, read-only memory, programmable memory, hard disk drive or any other type of volatile or non-volatile memory or storage device.

The computer system 800 may also include a disk, solid-state drive optical drive unit 815. The disk drive unit 815 may include a non-transitory or tangible computer-readable medium 840 in which one or more sets of instructions 802, e.g., software, can be embedded. Further, the instructions 802 may perform one or more of the operations as described herein. The instructions 802 may reside completely, or at least partially, within the memory 805 and/or within the processor 807 during execution by the computer system 800. The database or any other databases described above may be stored in the memory 805 and/or the disk unit 815.

The memory 805 and the processor 807 also may include non-transitory computer-readable media as discussed above. A "computer-readable medium," "computer-readable storage medium," and/or "machine readable medium," may include any device that includes, or stores software for use by or in connection with an instruction executable system, apparatus, or device. The machine-readable medium may selectively be, but not limited to, an electronic, magnetic, optical, electromagnetic, infrared, or semiconductor system, apparatus, or device.

Additionally, the computer system 800 may include an input device 825, such as a keyboard or mouse, configured for a user to interact with any of the components of system 800, including user selections or menu entries of display menus. It may further include a display 830, such as a liquid crystal display (LCD), a cathode ray tube (CRT), or any other display suitable for conveying information. The display 830 may act as an interface for the user to see the functioning of the processor 807, or specifically as an interface with the software stored in the memory 805 or the drive unit 815.

The computer system 800 may include a communication interface 836 that enables communications via the communications network 125. The network 125 may include wired networks, wireless networks, or combinations thereof. The communication interface 836 networks may enable communications via any number of communication standards, such as Ethernet AVB, 802.11, 802.17, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 807. Software modules may include instructions stored in the memory 805, or other memory device, that are executable by the processor 807 or other processors. Hardware modules may include various devices, components, circuits, gates, circuit boards, and the like that are executable, directed, and/or controlled for performance by the processor 807.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

By far, the present disclosure has been described with reference to the accompanying drawings through particular preferred embodiments. However, it should be noted that the present disclosure is not limited to the illustrated and provided particular embodiments, but various modification may be made within the scope of the present disclosure.

Further, the embodiments of the present disclosure can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example, a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example, by firmware.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A system for integrated multi-energy scheduling control in a micro-grid, the system comprising:
    at least one processor; and
    at least one non-transitory memory storing computer executable instructions,
    wherein the at least one memory and the computer executable instructions configured to, with the at least one processor, cause the system to:
        perform, based on predicted electricity demand and cooling demand and predicted renewable energy output of the micro-grid, multi-energy scheduling control of operation of a combined cooling, heating and power (CCHP) unit and an ice-storage air conditioner included in the micro-grid, under constraints of electricity supply/demand balance and cooling energy supply/demand balance, operation constraints for the CCHP unit, and operation constraints for the ice-storage air conditioner,
        control scheduling of operation of the CCHP unit and the ice-storage air condition to manage an amount of electricity exchanged between the micro-grid and a macro-grid, cooling power output; and
        control an electricity output of the CCHP unit, and operation modes and cooling power output of the ice-storage air conditioner in time intervals in a scheduling period, wherein the electricity supply/demand balance and the cooling energy supply/demand balance are coupled with each other.

2. The system according to claim 1, wherein the operation constraints for the CCHP unit comprise an operation constraint provided from an electricity output efficiency model and an operation constraint provide from an electricity output and cooling output relationship model.

3. The system according to claim 2, wherein the operation constraint provided from the electricity output efficiency model and wherein the computer executable instructions are further configured to cause the system to determine the electricity output and cooling output relationship model using the electricity output, ambient elevation and temperature as variables.

4. The system according to claim 3, wherein the operation constraint from the electricity output efficiency model comprises a relationship between electricity output efficiency and electricity output of the CCHP unit and wherein the computer executable instructions are further configured to cause the system to express the relationship as a function of a nominal output power of the CCHP unit under a standard working condition, a maximum output power of the CCHP unit under a given working condition; a maximum efficiency of the CCHP unit under the given working condition; and a partial-load performance function under the standard work condition.

5. The system according to claim 3, wherein the operation constraint from the electricity output and cooling output relationship model comprises a relationship between cooling power output and electricity output and wherein the computer executable instructions are further configured to cause the system to determine the cooling output of the CCHP unit at a given time as a function of the electricity output of the CCHP unit at the given time, or determine the electricity output of the CCHP unit at the given time as a function of the cooling output of the CCHP unit at the given time.

6. The system according to claim 4, wherein the computer executable instructions are further configured to cause the system to correct the maximum efficiency of the CCHP unit under the given working condition and the maximum output power of the CCHP unit under the given working condition by power correction factors and efficiency correction factors for inlet pressure loss and back pressure of the CCHP unit.

7. The system according to claim 4, wherein the operation constraint from the electricity output efficiency model further comprises one or more of:
    a relationship between consumed gas volume and the electricity output and the electricity output efficiency;
    a lower bound constraint on the electricity output of the CCHP unit;
    an upper bound constraint on the electricity output of the CCHP unit; and
    operation time limitations for the CCHP unit.

8. The system according to claim 1, wherein the micro-grid further comprises a wind power generator and a solar power generator, and wherein the computer executable instructions are further configured to cause the system to determine the constraint for the electricity supply/demand balance based on an amount of electric power exchanged between the micro-grid and the macro-grid, electric power output of the CCHP unit, electric power output of the wind power generator and electric power output of the solar power generator being equal to an electric load or predicted electricity demand of the microgrid, and consumed power of an air-conditioning mode, ice-making mode and ice-melting mode of the ice-storage air conditioner.

9. The system according to claim 1, wherein the constraint for the cooling energy supply/demand balance comprises a cooling load, or the predicted cooling demand, and wherein the computer executable instructions are further configured to cause the system to determine the cooling load, or the predicted cooling demand based on the combination of the cooling power output of the CCHP units, the cooling power output of the ice-storage air conditioner in air-conditioning mode and the cooling power output of the ice-storage air conditioner in ice-melting mode.

10. The system according to claim 1, wherein the scheduling period has a time length of 24 hours and the time interval has a time length of 1 hour.

11. The system according to claim 10, wherein a historical electricity demand and cooling demand comprise hourly electricity demand and hourly cooling demand in a previous day.

12. A method for integrated multi-energy scheduling control in a micro-grid, the method comprising:
    performing, by using a processor, based on predicted electricity demand and cooling demand and predicted renewable energy output of the micro-grid, a multi-energy scheduling control process for controlling operation of a combined cooling, heating and power (CCHP) unit and an ice-storage air conditioner included in the micro-grid under constraints of electricity supply/demand balance, cooling energy supply/demand balance, operation constraints for the CCHP unit and operation constraints for the ice-storage air conditioner; and controlling, based on the multi-energy scheduling control process, the amount of electricity exchanged between the micro-grid and a macro-grid, cooling power output and electricity output of the CCHP unit, and operation modes and cooling power output of the ice-storage air conditioner in time intervals in a scheduling period, wherein the electricity supply/demand balance and the cooling energy supply/demand balance are coupled with each other.

13. The method according to claim 12, wherein the operation constraints for the CCHP unit comprise an electricity output efficiency model and an electricity output and cooling output relationship model, and the method comprises determining the electricity output efficiency model and the electricity output and cooling output relationship model based on using the electricity output, ambient elevation and temperature as variables.

14. The method according to claim 12, wherein the operation constraints for the ice-storage air conditioner comprises:

the processor obtaining an operation constraint from an operation model in air-conditioning mode, the processor obtaining an operation constraint from an operation model in ice-making mode, the processor obtaining an operation constraint from an operation model in ice-melting mode, the processor obtaining an operation constraint from an operation model in ice-melting & air-conditioning mode, and the processor obtaining an operation constraint from an operation model of ice-storage tank.

15. The method according to claim 14, wherein obtaining the operation constraint from each of the operation model in air-conditioning mode, the operation model in ice-making mode, the operation model in ice-melting mode, and the operation model in ice-melting & air-conditioning mode comprises obtaining a cooling output constraint.

16. The method according to claim 14, wherein obtaining the operation constraint from each of the operation model in air-conditioning mode, the operation model in ice-making mode, the operation model in ice-melting mode, and the operation model in ice-melting & air-conditioning mode comprises obtaining an operation time limitation.

17. The method according to claim 14, wherein obtaining the operation constraint from the operation model in air-conditioning mode is determined by linear curve fitting of electric power consumed at a predetermined time to output cooling power at the predetermined time using a coefficient.

18. The method according to claim 14, wherein obtaining the operation constraint from the operation model in ice-making mode is determined by linear curve fitting of electric power consumed at a predetermined time to output cooling power at the predetermined time using a coefficient.

19. The method according to claim 14, wherein the operation model in ice-melting & air-conditioning mode is a combination of the operation model in air-conditioning mode and the operation model in ice-making mode.

20. The method according to claim 14, wherein obtaining the operation constraint from the operation model of ice-storage tank comprises:

using a relationship between cooling energy stored in ice-storage tank and a dissipation coefficient, a refrigeration efficiency and a maximum storage capacity of the ice-storage tank.

21. The method according to claim 20, wherein obtaining the operation constraint from the operation model of ice-storage tank further comprises one or more of:

obtaining a lower bound constraint on the cooling energy stored in the ice-storage tank in off-valley time;

obtaining an upper bound constraint on the cooling energy stored in the ice-storage tank in off-valley time;

obtaining a constrain on the cooling energy stored in the ice-storage tank at end of valley time;

obtaining a lower bound constraint on a continuous duration of ice-make mode; and obtaining an upper bound constraint on a continuous duration of ice-make mode.

22. The method according to claim 12, wherein the multi-energy scheduling control process is performed further under constraints for power exchanging between the micro-grid and the macro-grid.

23. The method according to claim 12, wherein the multi-energy scheduling control process comprises the processor selecting as particles of a particle swarm optimization algorithm the cooling output or the electricity output of the CCHP unit and cooling energy stored in ice-storage tank of the ice-storage air conditioner.

24. The method according to claim 23, wherein, in each of iterations of the particle swarm optimization algorithm, particles are corrected, after being updated in their respective searching spaces, so that coupled constraints among the particles are guaranteed.

25. An apparatus for integrated multi-energy scheduling in a micro-grid, the apparatus comprising:

a processor; and a non-transitory computer readable medium storing instructions executable by the processor, the computer readable medium comprising:

instructions executable by the processor to perform, based on predicted electricity demand and cooling demand and predicted renewable energy output of the micro-grid, a multi-energy scheduling control process for operating a combined cooling, heating and power CCHP unit and an ice-storage air conditioner included in the micro-grid under constraints of electricity supply/demand balance, cooling energy supply/demand balance, operation constraints for the CCHP unit, and operation constraints for the ice-storage air conditioner; and instructions executable by the processor to control the amount of electricity exchanged between the micro-grid and a macro-grid, cooling power output and electricity output of the CCHP unit, and operation modes and cooling power output of the ice-storage air conditioner in time intervals in a scheduling period, wherein the electricity supply/demand balance and the cooling energy supply/demand balance are coupled with each other.

* * * * *